United States Patent
Tang

(10) Patent No.: US 10,382,827 B2
(45) Date of Patent: Aug. 13, 2019

(54) CONTROL METHOD FOR MEDIA PLAYING, MEDIA SOURCE EQUIPMENT, MEDIA PLAYING EQUIPMENT AND SYSTEM

(71) Applicants: BOE TECHNOLOGY GROUP CO., LTD., Beijing (CN); K-TRONICS (SUZHOU) TECHNOLOGY CO., LTD., Suzhou, Jiangsu (CN)

(72) Inventor: Jinchao Tang, Beijing (CN)

(73) Assignees: BOE TECHNOLOGY GROUP CO., LTD., Beijing (CN); K-TRONICS (SUZHOU) TECHNOLOGY CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 15/557,315

(22) PCT Filed: Feb. 6, 2017

(86) PCT No.: PCT/CN2017/072985
§ 371 (c)(1),
(2) Date: Sep. 11, 2017

(87) PCT Pub. No.: WO2017/181760
PCT Pub. Date: Oct. 26, 2017

(65) Prior Publication Data
US 2018/0192147 A1    Jul. 5, 2018

(30) Foreign Application Priority Data
Apr. 18, 2016    (CN) .......................... 2016 1 0239165

(51) Int. Cl.
*G06F 3/00*       (2006.01)
*G06F 13/00*      (2006.01)
(Continued)

(52) U.S. Cl.
CPC ......... *H04N 21/485* (2013.01); *H04N 21/422* (2013.01); *H04N 21/43635* (2013.01);
(Continued)

(58) Field of Classification Search
CPC ............... H04N 21/485; H04N 21/422; H04N 21/43635; H04N 21/472; H04N 21/482; H04N 21/4854
See application file for complete search history.

(56) References Cited

U.S. PATENT DOCUMENTS 9,766,772 B2 *   9/2017   Hunt ..................... G06F 3/0346
2007/0124780 A1 * 5/2007   Lee ....................... G11B 19/025
                                                       725/89

(Continued)

FOREIGN PATENT DOCUMENTS

CN       101304497 A    11/2008
CN       104954846 A     9/2015
(Continued)

OTHER PUBLICATIONS

International Search Report and Written Opinion dated Apr. 26, 2017; PCT/CN2017/072985.

*Primary Examiner* — Mulugeta Mengesha
(74) *Attorney, Agent, or Firm* — Ladas & Parry LLP

(57) ABSTRACT

A control method for media playing, including: receiving user operation instructions by a media playing equipment; and transforming the user operation instructions into processing instructions corresponding to a media source equipment and forwarding the processing instructions to the media source equipment, if the menu currently displayed by the media playing equipment is not the control menu of the media playing equipment and the information input channel of the media playing equipment is the channel for the media source equipment inputting information to the media playing equipment. The method reduce the complexity of the user (Continued)

operation. A media source equipment, a media playing equipment and a system are also provided.

14 Claims, 4 Drawing Sheets

(51) Int. Cl.
*H04N 5/445* (2011.01)
*H04N 21/485* (2011.01)
*H04N 21/422* (2011.01)
*H04N 21/482* (2011.01)
*H04N 21/4363* (2011.01)
*H04N 21/472* (2011.01)

(52) U.S. Cl.
CPC ......... *H04N 21/472* (2013.01); *H04N 21/482* (2013.01); *H04N 21/4854* (2013.01)

(56) References Cited

U.S. PATENT DOCUMENTS

| | | | |
|---|---|---|---|
| 2009/0102983 A1* | 4/2009 | Malone | H04N 5/4403 348/734 |
| 2016/0014457 A1* | 1/2016 | Dua | H04L 29/06027 725/25 |
| 2016/0021327 A1 | 1/2016 | Wang | |

FOREIGN PATENT DOCUMENTS

| | | |
|---|---|---|
| CN | 105338385 A | 2/2016 |
| CN | 105872737 A | 8/2016 |

\* cited by examiner

CONTROL METHOD FOR MEDIA PLAYING, MEDIA SOURCE EQUIPMENT, MEDIA PLAYING EQUIPMENT AND SYSTEM

TECHNICAL FIELD

The present disclosure relates to a control method for media playing as well as a media source equipment, a media playing equipment and a system.

BACKGROUND

At present, the existing media source equipments and media playing equipments on the market are independent of each other and controlled by separate controllers independently. Media source equipments (e.g. a player box) are providers of video contents while media playing equipments (e.g. a television) are display devices for video contents. Since media playing equipments and media source equipments are controlled independently, the control methods for them are relatively complex.

Moreover, the existing media source equipments and media playing equipments exist independently and controlled by their own remote controllers respectively, causing much inconvenience to their user.

SUMMARY

According to at least one embodiment of this disclosure, a control method for media playing is provided, comprising: receiving user operation instructions by a media playing equipment; and transforming the user operation instructions into processing instructions corresponding to a media source equipment and forwarding the processing instructions to the media source equipment, if the menu currently displayed by the media playing equipment is not the control menu of the media playing equipment and the information input channel of the media playing equipment is the channel for the media source equipment inputting information to the media playing equipment.

For example, further comprising: handling the media playing equipment in accordance with the user operation instructions, if the menu currently displayed by the media playing equipment is the control menu of the media playing equipment or the information input channel of the media playing equipment is not the channel for the media source equipment to input information to the media playing equipment.

For example, transforming the user operation instructions into processing instructions corresponding to the media source equipment comprises: transforming the user operation instructions into processing instructions corresponding to the interface of the information input channel of the media playing equipment.

For example, the media source equipment transmits information to the media playing equipment through a high definition media interface; and transforming the user operation instructions into processing instructions corresponding to the interface of the information input channel of the media playing equipment comprises: transforming the user operation instructions into serial port communication processing instructions corresponding to the high definition media interface.

For example, the user operation instructions include display settings and general settings.

For example, the display settings include settings for width to height ratio of screen and image mode.

For example, the general settings include settings for language, icon display, automatic shut-off of power supply, audio, connection, software version upgrade, or on/off switching of the media source equipment and parameter adjustment of the media source equipment.

According to at least one embodiment of this disclosure, a control method for media displaying comprising: receiving processing instructions sent by a media playing equipment, the processing instructions being used to determine the operation by a user; transforming the processing instructions into operation instructions to be executed by a media source equipment; executing the operation instructions; and generating feedback instructions carrying the result of the execution and sending the feedback instructions to the media playing equipment.

For example, the operation instructions include instructions for moving an option box up, moving an option box down, moving an option box to the left, moving an option box to the right, determining instructions or homepage switching instruction for switching the main interfaces between the media playing equipment and the media source equipment.

According to at least one embodiment of this disclosure, a media playing equipment comprising: an instruction receiving module configured to receive user operation instructions for the media playing equipment; and an instruction forwarding module configured to transform the user operation instructions into processing instructions corresponding to a media source equipment and forwarding the processing instructions to the media source equipment, if the menu currently displayed by the media playing equipment is not the control menu of the media playing equipment and the information input channel of the media playing equipment is the channel for the media source equipment inputting information to the media playing equipment.

For example, further comprising: an instruction processing module configured to handle the media playing equipment in accordance with the user operation instructions, if the menu currently displayed by the media playing equipment is the control menu of the media playing equipment or if the information input channel of the media playing equipment is not the channel for the media source equipment to input information to the media playing equipment.

For example, in transforming the user operation instructions into processing instructions corresponding to the media source equipment, the instruction forwarding module is further configured to transform the user operation instructions into processing instructions corresponding to the interface of the information input channel of the media playing equipment.

For example, the media source equipment transmits information to the media playing equipment via a high definition multimedia interface; and in transforming the user operation instructions into processing instructions corresponding to the interface of the information input channel of the media playing equipment, the instruction forwarding module is further configured to transform the user operation instructions into serial port communication processing instructions corresponding to the high definition multimedia interface.

For example, the user operation instructions include display settings and general settings.

For example, the display settings include settings for width to height ratio of screen and image mode.

For example, the general settings include settings for language, icon display, automatic shut-off of power supply, audio, connection, upgrade of software version, or on/off switching and parameter adjustment of the media source equipment.

According to at least one embodiment of this disclosure, a media source equipment comprising: an instruction receiving module used to receive processing instructions sent by a media playing equipment, the processing instructions being used to determine the operation by a user; an instruction executing module used to transform the processing instructions into operation instructions to be executed by the media source equipment and execute the operation instructions; and an instruction forwarding module used to generate feedback instructions carrying the result of the execution and send the feedback instructions to the media playing equipment.

For example, the operation instructions include instructions for moving an option box up, moving an option box down, moving an option box to the left, moving an option box to the right, determining instructions or homepage switching instructions for switching the main interfaces between the media playing equipment and the media source equipment.

According to at least one embodiment of this disclosure, a media playing system comprising the media playing equipment and the media source equipment.

For example, the media source equipment transmits information to the media playing equipment via a high definition media interface.

For example, the media playing equipment is a television and the media source equipment is a player box.

DETAILED DESCRIPTION

Embodiments of the present disclosure provide a control method for media playing as well as a media source equipment, a media playing equipment and a system, which enable the media playing equipment to choose to either process or forward user operation instructions, so that the media playing equipment is enabled to control the media source equipment only by executing the user operation instructions sent to the media playing equipment, reducing the complexity degree of operations by an user.

Hereafter, technical solutions of the present disclosure will be described clearly and comprehensively with reference to the accompanying drawings in embodiments of the present disclosure. Obviously, the embodiments to be described are only some, not all, embodiments of the present disclosure. Based on embodiments of the present disclosure, all other embodiments that can be obtained by those of ordinary skills in the art without any creative effort still fall within the scope claimed by the present disclosure.

Figure 1A:
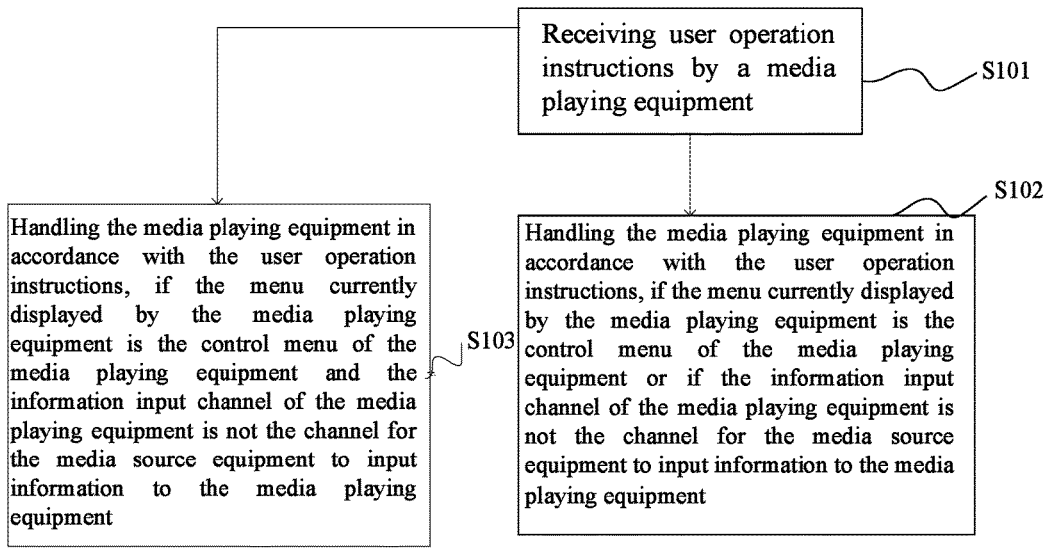
FIG. 1a is a flow chart illustrating a control method for a media playing equipment provided in an embodiment of the present disclosure.

With reference to FIG. 1, on the media playing equipment side, an embodiment of the present disclosure provides a control method for media playing, which may be implemented in software (e.g. computer program codes), hardware or firmware. For example, the hardware that can be used may be a general purpose processor (a central processing unit) or an application-specific processor (e.g. a programmable logic circuit). The method includes:

S101: receiving user operation instructions by a media playing equipment;

S102: handling the media playing equipment in accordance with the user operation instructions, if the menu currently displayed by the media playing equipment is the control menu of the media playing equipment or if the information input channel of the media playing equipment is not the channel for the media source equipment to input information to the media playing equipment; and S103: transforming the user operation instructions into processing instructions corresponding to the media source equipment and forwarding the processing instructions to the media source equipment, if the menu currently displayed by the media playing equipment is not the control menu of the media playing equipment and the information input channel of the media playing equipment is the channel for the media source equipment to input information to the media playing equipment.

The steps S102 and S103 are performed simultaneously without any particular order. For example, the step S101 may include transmitting user operation instructions by a user using a remote control device, or initiating user operation instructions on the media playing equipment by clicking or any other means.

When the media playing equipment receives user operation instructions, it is determined whether the menu the media playing equipment presents to the user is the control menu of the media playing equipment and at the same time it is determined whether the information input channel of the media playing equipment is the channel for the media source equipment to input information to the media playing equipment.

If the menu currently displayed by the media playing equipment is its control menu or the information input channel of the media playing equipment is not the channel for the media source equipment to input information to the media playing equipment, it is determined that the user operation instructions are issued for the media playing equipment and then the media playing equipment is handled in accordance with the user operation instructions. In this case, the user operation instructions may include display settings and general settings. The display settings include those for width to height ratio and/or image mode. The general settings include those for language, icon display, automatic shut-off of power supply, audio, connection and/or software version upgrade.

In accordance with an example of the present disclosure, the user operation instructions may further include settings for on/off switching and parameter adjustment of the media source equipment.

If the menu currently displayed by the media playing equipment is not its control menu and the information input channel of the media playing equipment is the channel for the media source equipment to input information to the media playing equipment, it is determined that the user operation instructions are issued for the multimedia source equipment, i.e. the user interface seen by the user is the one for the multimedia source equipment, and then the user operation instructions are forwarded to the media source equipment after having been transformed into processing instructions corresponding to the media source equipment.

At this point, the user operation instructions are transformed into processing instructions corresponding to the media source equipment; for example, the user operation instructions are transformed into processing instructions corresponding to the interface of the information input channel of the media playing equipment.

In accordance with an example of the present disclosure, the media source equipment may transmit information to the media playing equipment via a high definition multimedia interface (HDMI).

The media playing equipment may have multiple paths of HDMI interfaces. In an embodiment of the present disclosure, the media source equipment is connected via a first HDMI interface on the media playing equipment side while both the outputs of the consumer electronics control (CEC) and the audio return channel control (ARC) of the media playing equipment use the HDMI interface. That is to say, the media source equipment and the media playing equipment communicate with each other in a full duplex serial port mode. The pin 13 and the pin 14 of the first HDMI interface are modified to function as the transmitting port and the receiving port of the first HDMI interface respectively. The pin 13 of the second HDMI interface is the function pin for CEC and ARC to ensure that the first HDMI interface of the media playing equipment keeps its normal CEC function, i.e. the CECs of other equipments connected via the second HDMI interface may function properly. The media stream output by the media source equipment is input to the media playing equipment via the first HDMI interface.

By using HDMI interfaces, various multimedia transmissions of high resolution can be achieved with a small volume occupied, and furthermore with standardization of HDMI interfaces and serial port instructions, the media playing equipment is enabled to be compatible with the media source equipment, achieving a standardized design and improving developing efficiency of designers.

For example, the processing instructions are binary data.

Figure 1B:
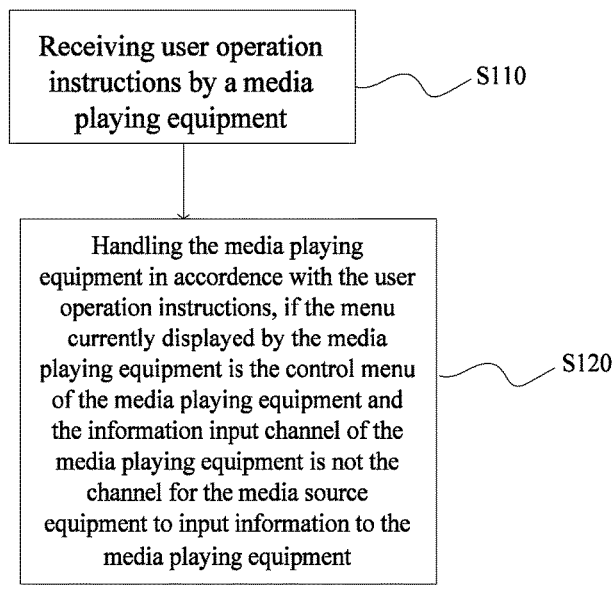
FIG. 1b is a flow chart illustrating another control method for a media playing equipment provided in an embodiment of the present disclosure.

In addition, in accordance with an example of the present disclosure, as showing in FIG. 1b, an embodiment of the present disclosure provides, on the media playing equipment side, another control method for media displaying and the step S102 may not included in the control method. This method includes:

S110: receiving user operation instructions by a media playing equipment; and

S120: transforming the user operation instructions into processing instructions corresponding to a media source equipment and forwarding the processing instructions to the media source equipment, if the menu currently displayed by the media playing equipment is not its control menu and the information input channel of the media playing equipment is the channel for the media source equipment to input information to the media playing equipment.

The steps S110 and S120 correspond to the steps S101 and S103 respectively and therefore they will not be explained repeatedly here.

Figure 2:
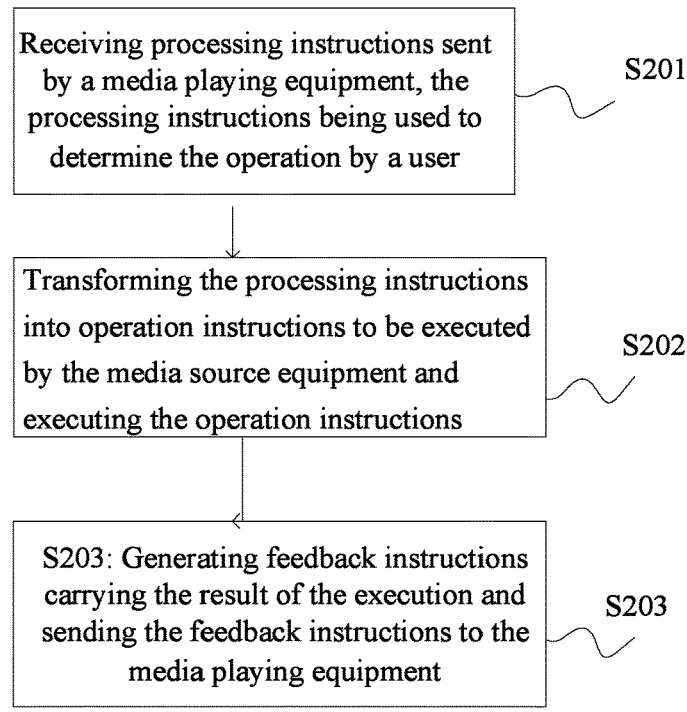
FIG. 2 is flow chart illustrating a processing method of a media source equipment provided in an embodiment of the present disclosure.

With reference to FIG. 2, on the media source equipment side, an embodiment of the present disclosure provides a processing method of a media source equipment. The method includes:

S201: receiving processing instructions sent by a media playing equipment, the processing instructions being used to determine the operation by a user;

S202: transforming the processing instructions into operation instructions to be executed by the media source equipment and executing the operation instructions; and S203: generating feedback instructions carrying the result of the execution and sending the feedback instructions to the media playing equipment.

In accordance with an example of the present disclosure, the processing instructions are serial port communication processing instructions corresponding to the HDMI interfaces, and for example the step S202 may include:

transforming the serial port communication processing instructions into operation instructions to be executed by the media source equipment in accordance with a serial port instruction standard corresponding to the HDMI interfaces, and executing the operation instructions.

For example, the operation instructions include those for moving an option box up, moving an option box down, moving an option box to the left, moving an option box to the right, determining instructions and homepage switching between the main interfaces of the media playing equipment and the media source equipment.

Figure 3:
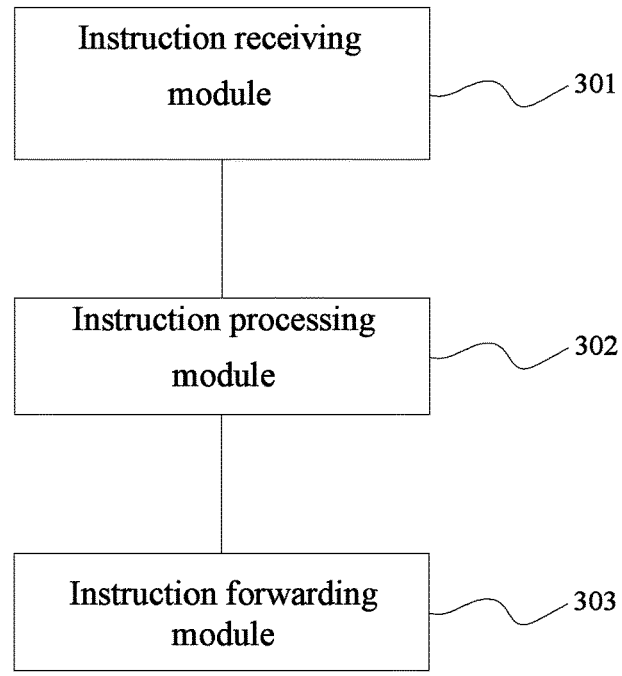
FIG. 3 is a structure diagram of a media playing equipment provided in an embodiment of the present disclosure.

With reference to FIG. 3, an embodiment of the present disclosure provides a media playing equipment, which includes:

an instruction receiving module 301 used by the media playing equipment to receive user operation instructions;

an instruction processing module 302 used to handle the media playing equipment in accordance with the user operation instructions, if the menu currently displayed by the media playing equipment is the control menu of the media playing equipment or if the information input channel of the media playing equipment is not the channel for the media source equipment to input information to the media playing equipment; and an instruction forwarding module 303 used to transform the user operation instructions into processing instructions corresponding to the media source equipment and forwarding the processing instructions to the media source equipment, if the menu currently displayed by the media playing equipment is not the control menu of the media playing equipment and the information input channel of the media playing equipment is the channel for the media source equipment to input information to the media playing equipment.

In accordance with an example of the present disclosure, in transforming the user operation instructions into processing instructions corresponding to the media source equipment, the instruction forwarding module 303 is used, for example, to:

transform the user operation instructions into processing instructions corresponding to the interface of the information input channel of the media playing equipment.

In accordance with an example of the present disclosure, the media source equipment transmits information to the media playing equipment via an HDMI interface.

In transforming the user operation instructions into processing instructions corresponding to the interface of the information input channel of the media playing equipment, for example, the instruction forwarding module 303 may further transform the user operation instructions into serial port communication processing instructions corresponding to the HDMI interface.

In accordance with an example of the present disclosure, the media playing equipment may be a television, a monitor of a computer or any other equipment with the functionality of media playing.

In correspondence with the media displaying method described above, there may also he no need for the media displaying device in the present disclosure to include the instruction processing module 302, and instead it may only include the instruction receiving module 301 and the instruction forwarding module 303.

Figure 4:
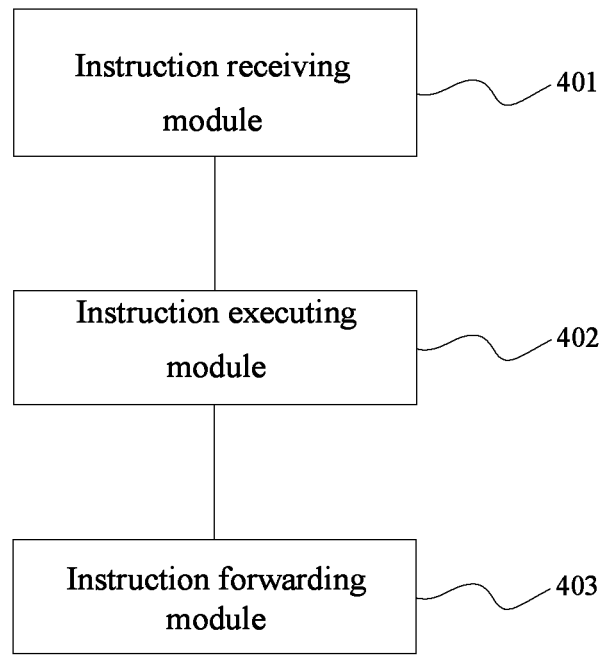
FIG. 4 is a structure diagram of a media source equipment provided in an embodiment of the present disclosure.

With reference to FIG. 4, an embodiment of the present disclosure provides a media source equipment, which includes:

an instruction receiving module 401 used to receive processing instructions sent by the media playing equipment, the processing instructions being used to determine the operation by a user;

an instruction executing module 402 used to transform the processing instructions into operation instructions to be executed by the media source equipment and execute the operation instructions; and an instruction forwarding module 403 used to generate feedback instructions carrying the result of the execution and send the feedback instructions to the media playing equipment.

Figure 5:
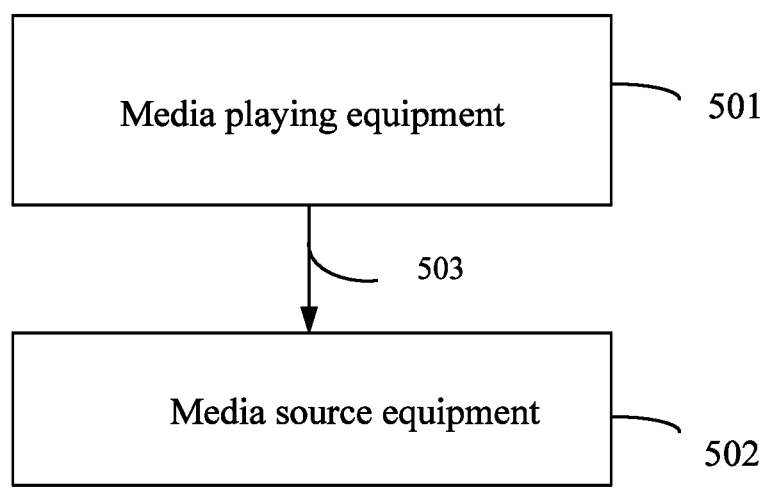
FIG. 5 is a structure diagram of a media playing system provided in an embodiment of the present disclosure.

This media source equipment corresponds to the processing method of the media source equipment in the embodiment described above and will not be explained repeatedly here. In accordance with an example of the present disclosure, the media source equipment may be a player box. With reference to FIG. 5, an embodiment of the present disclosure provides a media displaying system including a media playing equipment 501 and a media source equipment 502.

In accordance with an example of the present disclosure, the system further includes a data line 503 connecting the media playing equipment with the media source equipment.

The data line may be a connecting line for an HDMI interface, i.e. the media source equipment transmits information to the media playing equipment through an HDMI interface.

In order to facilitate understanding, the solution of the present disclosure will be further explained in an embodiment.

Figure 6:
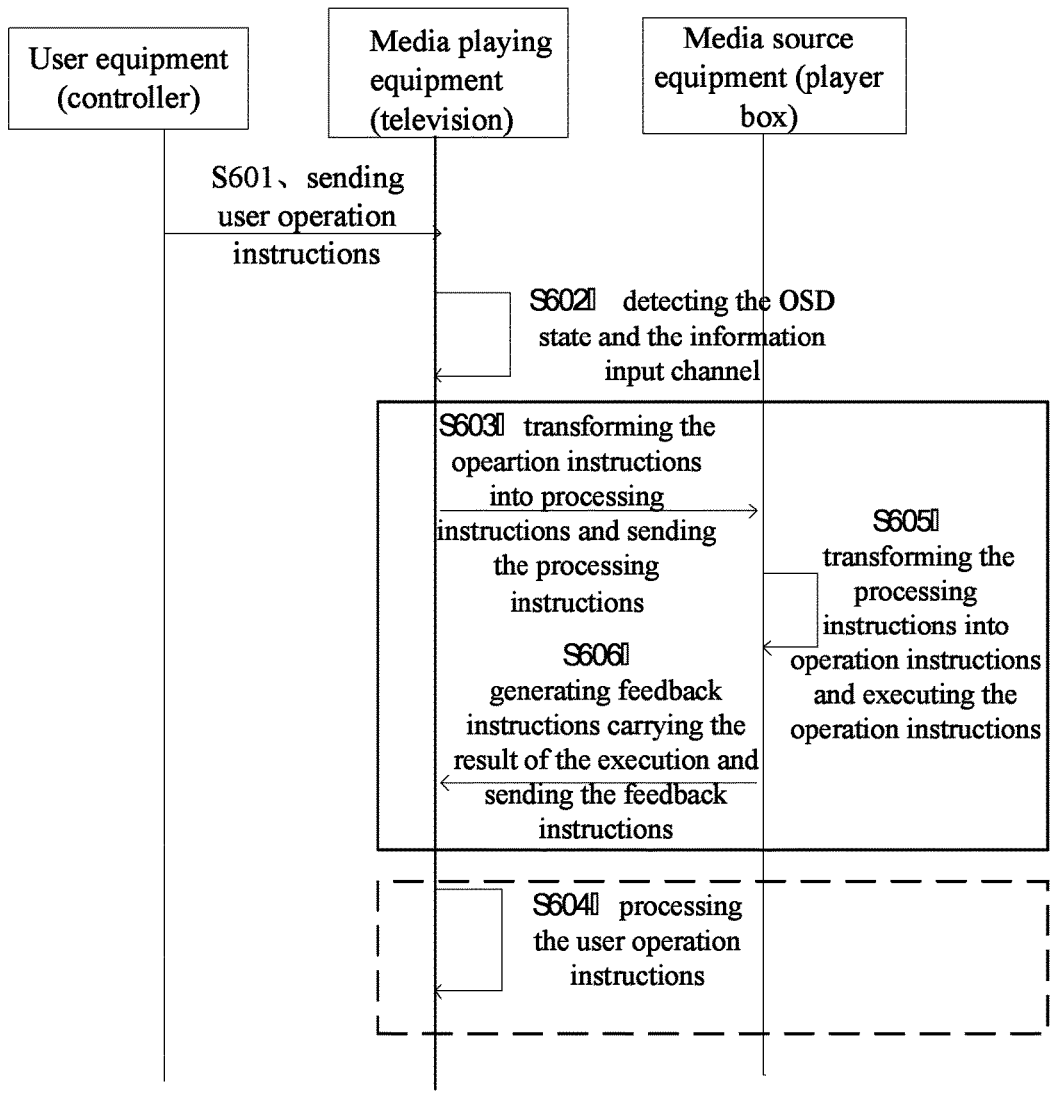
FIG. 6 is a flow chart illustrating a control method for a media player provided in an embodiment of the present disclosure.

With reference to FIG. 6, in the embodiment of the present disclosure, a television is used as a master control terminal to execute the operation instructions issued by a user. For example, the operations are as follows.

S601: The user presses a button on a remote controller, and meanwhile the remote controller sends the user operation instruction corresponding to the button to the television.

S602: The television receives the user operation instruction sent by the remote controller and detects the state of on screen display (OSD) and the information input channel. When the OSD state is 1, it is indicated that the menu displayed on the television is the control menu of the television. When the OSD state is 0, it is indicated that what is displayed on the television is not the control menu of the television.

S603: If the OSD state of the television is 0, i.e. MApp_ZUI_GetActive( )==E_OSD_EMPTY, and the information input channel through which the player box inputted information to the television is a first HDMI interface, i.e. enInputSource==UI_INPUT_SOURCE_HDMI1, the user operation instruction is transformed into a processing instruction corresponding to the player box and forwarded to the player box.

S604: if the OSD state of the television is 1 or the information input channel through which the player box inputted information to the television is not the first HDMI interface, the television processes the user operation instruction directly.

At this point, only when the step S603 occurs, the following steps, i.e. steps S605 and S606, are performed.

S605: The player box receives the processing instruction, transforms the processing instruction into an operation instruction for the player box, and executes the operation instruction.

S606: The player box generates a feedback instruction carrying the result of the execution and sends the feedback instruction to the television.

The information input channel in the step S603 includes at least one of: a digital television (DTV), an analog television (ATV), a component, a red, green and blue (KGB) color mode, an HDMI, a transmission port of a household audio and video (AV) apparatus and a digital media player (DMP).

In summary, embodiments of the present disclosure provide a control method for media displaying, a media source equipment, a media playing equipment and a system, which enable the media playing equipment to choose to either process or forward user operation instructions, and in turn to control the media source equipment. That is to say, only one control equipment is used to control user operations on the media playing equipment and the media source equipment, reducing the complexity degree of user operations and facilitating usage by a user. The media playing equipment uses a first HDMI interface to receive media streams and instructions input from the media source equipment and a second HDMI interface to perform the CEC and ARC functions of the media playing equipment, so that the CEC and ARC functions of the media playing equipment can be ensured to serve properly and complexity degree of user operations can be reduced. In addition, embodiments of the present disclosure also have the advantage of integrating the display and playing function of the media playing equipment with the media resources of the media source equipment. By means of HDMI interfaces, various multimedia transmissions of high resolution can be achieved with the equipments occupying a small volume. Furthermore, with standardization of HDMI interfaces and serial port instructions, the media playing equipment is enabled to be compatible with the media source equipment, achieving a standardized design and improving developing efficiency of designers.

Those skilled in the art should understand that embodiments of the present disclosure may be provided as a method, a device (equipment) or a computer program product. Therefore, the present disclosure may take the form of a complete hardware embodiment, a complete software embodiment or an embodiment combining software and hardware aspects. Furthermore, the present disclosure may take the form of one or more computer program product implemented on a computer useable storage medium (including, but not limited to disk storage, read-only optical disc, optical memory etc.) and containing computer usable program codes.

The present disclosure is described with reference to flow charts and/or block diagrams of the method, device (equipment) and computer program product according to embodiments of the present disclosure. It is understood that each flow and/or block in the flow charts and/or block diagrams and combinations thereof may be implemented by computer program instructions. These computer program instructions may be provided to the processor of a general purpose computer, a special purpose computer, an embedded processor or other programmable data processing equipment to generate a machine such that instructions executed by the processor of the computer or other programmable data processing equipment generates a device that implements functions specified in one or more flows in the flow chart and/or one or more blocks in the block diagram.

These computer program instructions may be also stored in a computer readable storage that can direct a computer or other programmable data processing equipments to operate in a particular way such that instructions stored in the computer readable storage generate a manufactured article including an command equipment that implements functions specified in one or more flows of the flow chart and/or one or more blocks of the block diagram.

These computer program instructions may be also loaded onto a computer or other programmable data processing equipments such that a series of operation steps will be executed on the computer or other programmable equipments to generate computer implemented processing, so that instructions executed on the computer or other programmable equipments provide steps for implementing functions specified in one or more flows in the flow chart and/or one or more blocks in the block diagram.

Obviously, the skilled in the art may implement various amendments and modification without separate from the spirit and scope of this disclosure. Thus, if these amendments and modification belong to the scope of the claims of this disclosure and its equivalent techniques, these amendments and modification are also be intended to include.

The present application claims priority of China patent application No. 201610239165.3 filed on Apr. 18, 2016, which is incorporated herein in its entirety by reference as a part of the present application.

The invention claimed is:

1. A control method for media playing, comprising:
receiving user operation instructions by a media playing equipment; and the media playing equipment judging whether a menu currently displayed by the media playing equipment is a control menu of the media playing equipment:
the media playing equipment judging whether the information input channel of the media playing equipment is the channel for the media source equipment inputting information to the media playing equipment:
the media playing equipment transforming the user operation instructions into processing instructions corresponding to a media source equipment, if the menu currently displayed by the media playing equipment is not the control menu of the media playing equipment and the information input channel of the media playing equipment is the channel for the media source equipment inputting information to the media playing equipment,
the media playing equipment forwarding the processing instructions to the media source equipment.

2. The method of claim 1, further comprising:
the media playing equipment handling the media playing equipment in accordance with the user operation instructions, if the menu currently displayed by the media playing equipment is the control menu of the media playing equipment or the information input channel of the media playing equipment is not the channel for the media source equipment to input information to the media playing equipment.

3. The method of claim 1, wherein the media playing equipment transforming the user operation instructions into processing instructions corresponding to the media source equipment comprises:
the media playing equipment transforming the user operation instructions into processing instructions corresponding to the interface of the information input channel of the media playing equipment.

4. The method of claim 3, wherein the media source equipment transmits information to the media playing equipment through a high definition media interface; and
the media playing equipment transforming the user operation instructions into processing instructions corresponding to the interface of the information input channel of the media playing equipment comprises:
the media playing equipment transforming the user operation instructions into serial port communication processing instructions corresponding to the high definition media interface.

5. The method of any one of claim 1, wherein the user operation instructions include display settings and general settings.

6. The method of claim 5, wherein the display settings include settings for width to height ratio of screen and image mode.

7. The method of claim 5, wherein the general settings include settings for language, icon display, automatic shut-off of power supply, audio, connection, software version upgrade, or on/off switching of the media source equipment and parameter adjustment of the media source equipment.

8. A media playing equipment comprising:
a processor:
a memory for storing computer program instructions, the computer program instructions, when being executed by the processor, perform:
receiving user operation instructions by a media playing equipment: and
the media playing equipment judging whether a menu currently displayed by the media playing equipment is a control menu of the media playing equipment:
the media playing equipment judging whether the information input channel of the media playing equipment is the channel for the media source equipment inputting information to the media playing equipment;
the media playing equipment transforming the user operation instructions into processing instructions corresponding to a media source equipment, if the menu currently displayed by the media playing equipment is not the control menu of the media playing equipment and the information input channel of the media playing equipment is the channel for the media source equipment inputting information to the media playing equipment, the media playing equipment forwarding the processing instructions to the media source equipment.

9. The media playing equipment of claim 8, the computer program instructions, when being executed by the processor, further perform:
the media playing equipment handling the media playing equipment in accordance with the user operation instructions, if the menu currently displayed by the media playing equipment is the control menu of the media playing equipment or if the information input channel of the media playing equipment is not the channel for the media source equipment to input information to the media playing equipment.

10. A media playing equipment of claim 8, wherein the media playing equipment transforming the user operation instructions into
   processing instructions corresponding to the media source equipment, comprises:
   the media playing equipment transforming the user operation instructions into processing instructions corresponding to the interface of the information input channel of the media playing equipment.

11. The media playing equipment of claim 10, wherein the media source equipment transmits information to the media playing equipment via a high definition multimedia interface; and
   wherein, the media playing equipment transforming the user operation instructions into processing instructions corresponding to the interface of the information input channel of the media playing equipment, comprises: the media playing equipment transforming the user operation instructions into serial port communication processing instructions corresponding to the high definition multimedia interface.

12. The media playing equipment of any one of claim 8, wherein the user operation instructions include display settings and general settings.

13. The media playing equipment of claim 12, wherein the display settings include settings for width to height ratio of screen and image mode.

14. The media playing equipment of claim 12, wherein the general settings include settings for language, icon display, automatic shut-off of power supply, audio, connection, upgrade of software version, or on/off switching and parameter adjustment of the media source equipment.

\* \* \* \* \*